(12) United States Patent
Piscopo

(10) Patent No.: US 9,444,854 B2
(45) Date of Patent: Sep. 13, 2016

(54) SESSION INITIATION PROTOCOL (SIP) ROUTER

(75) Inventor: Robert Piscopo, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 208 days.

(21) Appl. No.: 12/877,091

(22) Filed: Sep. 7, 2010

(65) Prior Publication Data
US 2012/0057573 A1 Mar. 8, 2012

(51) Int. Cl.
| | |
|---|---|
| *H04L 29/06* | (2006.01) |
| *H04L 29/12* | (2006.01) |
| *H04L 12/66* | (2006.01) |
| *H04W 92/02* | (2009.01) |
| *H04W 8/02* | (2009.01) |

(52) U.S. Cl.
CPC ......... *H04L 65/1069* (2013.01); *H04L 65/104* (2013.01); *H04L 65/1006* (2013.01); *H04L 12/66* (2013.01); *H04L 29/12066* (2013.01); *H04L 29/12075* (2013.01); *H04L 29/12084* (2013.01); *H04L 29/12094* (2013.01); *H04L 65/1016* (2013.01); *H04W 8/02* (2013.01); *H04W 92/02* (2013.01)

(58) Field of Classification Search
None
See application file for complete search history.

(56) References Cited

U.S. PATENT DOCUMENTS

| | | | | | |
|---|---|---|---|---|---|
| 6,078,575 | A * | 6/2000 | Dommety et al. | ............ | 370/338 |
| 6,222,829 | B1 * | 4/2001 | Karlsson | ............ | H04M 7/0057 370/329 |
| 6,253,072 | B1 * | 6/2001 | Verdonk | ...................... | 455/406 |
| 6,327,267 | B1 * | 12/2001 | Valentine | ............. | H04Q 3/0025 370/355 |
| 6,963,635 | B1 * | 11/2005 | Jones | .................... | H04M 7/006 370/352 |
| 7,450,565 | B2 * | 11/2008 | Suotula | ............... | H04M 7/1285 370/352 |
| 7,941,171 | B2 * | 5/2011 | Vempati | .................. | H04W 4/10 455/416 |
| 7,991,394 | B2 * | 8/2011 | Gonen | .................... | H04W 8/06 455/432.1 |
| 8,199,727 | B1 * | 6/2012 | Bienn | ................. | H04M 7/0072 370/231 |
| 2002/0024943 | A1 * | 2/2002 | Karaul et al. | ................. | 370/338 |

(Continued)

FOREIGN PATENT DOCUMENTS

WO 2008055913 A1 5/2008

OTHER PUBLICATIONS

European Search Report dated Feb. 20, 2014 issued in EP Application No. 11 82 3991, 6 pp.

(Continued)

*Primary Examiner* — Andrew Oh
(74) *Attorney, Agent, or Firm* — Perkins Coie LLP

(57) ABSTRACT

Systems and methods for a Session Initiation Protocol (SIP) router are described. In one aspect, the SIP router receives a SIP INVITE for an incoming call to a target mobile subscriber. Responsive to receiving the SIP INVITE, the SIP router identifies, via a Send Routing Information for Short Message (SRI/SM) request to a Home Location Register, a first address of a serving switch in a circuit-switched mobile network; a mobile telephony device associated with the target mobile subscriber is currently location-updated on the serving switch. The SIP router maps the first address to a second address for the serving switch; the second address being a SIP address. Using the SIP address, the SIP router sends the received SIP INVITE to a SIP interface of the serving switch. The serving switch being configured to process the received SIP INVITE and the incoming call to the target mobile subscriber.

12 Claims, 3 Drawing Sheets

(56) References Cited

U.S. PATENT DOCUMENTS

| | | | |
|---|---|---|---|
| 2003/0169768 A1* | 9/2003 | Bienn | H04W 28/06 370/469 |
| 2004/0185836 A1* | 9/2004 | Pelaez | H04M 3/2281 455/414.1 |
| 2005/0002407 A1* | 1/2005 | Shaheen | H04L 12/5835 370/401 |
| 2005/0003805 A1* | 1/2005 | Zaffino | H04L 29/06 455/414.1 |
| 2005/0070282 A1* | 3/2005 | Hinz | 455/435.1 |
| 2005/0192005 A1* | 9/2005 | Blom | H04W 24/04 455/432.1 |
| 2006/0077957 A1* | 4/2006 | Reddy | H04M 3/42229 370/352 |
| 2006/0079236 A1* | 4/2006 | Del Pino | H04L 65/1016 455/445 |
| 2006/0092925 A1* | 5/2006 | Svensson et al. | 370/352 |
| 2006/0142011 A1 | 6/2006 | Kallio | |
| 2007/0049281 A1* | 3/2007 | Chen | H04W 4/16 455/445 |
| 2007/0060124 A1* | 3/2007 | Kalavade | H04M 3/54 455/433 |
| 2007/0149166 A1* | 6/2007 | Turcotte | H04W 4/22 455/404.1 |
| 2007/0153766 A1* | 7/2007 | Bienn et al. | 370/352 |
| 2007/0184860 A1* | 8/2007 | Jansson | H04L 12/5895 455/466 |
| 2007/0207784 A1* | 9/2007 | Ewert | H04L 29/06027 455/414.1 |
| 2007/0263599 A1* | 11/2007 | Itzkovitz | H04L 65/1016 370/352 |
| 2007/0291733 A1* | 12/2007 | Doran | H04L 12/66 370/352 |
| 2008/0039104 A1* | 2/2008 | Gu | H04W 8/04 455/445 |
| 2008/0064391 A1* | 3/2008 | Cai et al. | 455/426.1 |
| 2008/0096597 A1* | 4/2008 | Vempati | H04W 4/10 455/518 |
| 2008/0117893 A1* | 5/2008 | Witzel | H04W 80/10 370/352 |
| 2008/0144494 A1* | 6/2008 | Casey | H04L 65/1036 370/230 |
| 2008/0144615 A1* | 6/2008 | Casey | 370/389 |
| 2008/0153490 A1* | 6/2008 | Lee et al. | 455/435.1 |
| 2008/0280617 A1* | 11/2008 | Aguilar et al. | 455/445 |
| 2008/0292074 A1 | 11/2008 | Boni et al. | |
| 2008/0309557 A1* | 12/2008 | Mailaender | 342/463 |
| 2009/0036146 A1* | 2/2009 | Lamba | H04W 8/12 455/456.3 |
| 2009/0111489 A1* | 4/2009 | Wilson | H04W 4/14 455/466 |
| 2009/0129578 A1* | 5/2009 | Zhou | 379/207.15 |
| 2009/0221310 A1* | 9/2009 | Chen | H04L 12/5835 455/466 |
| 2010/0062807 A1* | 3/2010 | Yao | H04M 3/42034 455/558 |
| 2010/0085937 A1* | 4/2010 | Pressley | H04W 8/06 370/331 |
| 2010/0098241 A1* | 4/2010 | Laster | H04Q 3/005 379/221.13 |
| 2010/0128685 A1* | 5/2010 | Jiang | H04W 8/12 370/329 |
| 2010/0158201 A1 | 6/2010 | Vijay Marathe et al. | |
| 2010/0190492 A1* | 7/2010 | Jiang | H04M 15/55 455/432.1 |
| 2010/0220667 A1* | 9/2010 | Noldus | H04W 8/082 370/329 |
| 2010/0250662 A1* | 9/2010 | Agarwal | H04L 29/12188 709/203 |
| 2010/0272096 A1* | 10/2010 | Witzel | H04L 65/1016 370/352 |
| 2010/0330960 A1* | 12/2010 | Ravishankar | H04M 3/2281 455/410 |
| 2010/0330987 A1* | 12/2010 | Lee | H04W 8/26 455/432.1 |
| 2010/0331023 A1* | 12/2010 | Cai | H04L 12/5855 455/466 |
| 2011/0110298 A1* | 5/2011 | Yi et al. | 370/328 |
| 2011/0263247 A1* | 10/2011 | Smelov | H04W 4/021 455/432.1 |
| 2011/0310884 A1* | 12/2011 | Arauz-Rosado | 370/352 |
| 2012/0258743 A1* | 10/2012 | Kurokawa | H04L 12/6418 455/466 |

OTHER PUBLICATIONS

International Searching Authority, International Search Report, PCT Application PCT/US2011/050463, mailed Jan. 4, 2012, 2 pages.

* cited by examiner

SESSION INITIATION PROTOCOL (SIP) ROUTER

BACKGROUND

The increasing use of data communication networks is creating an increased use of Voice over Internet Protocol (VoIP) calls between users. These VoIP calls often are routed among different types of data communication networks, such as the Internet, Local Area Networks (LANs), mobile communication networks, and so forth. Users of mobile networks may connect to the network through any number of different mobile switching centers. When routing calls to mobile device users in mobile networks, the system must locate the user's mobile device within the mobile network to properly communicate the call to the user.

Existing systems that attempt to route a VoIP call to a user in a mobile network often route the call through multiple mobile switching centers until the mobile device associated with the call recipient is located. This multiple routing of calls destined for a user in a mobile network is inefficient and costly due to the increased usage of network resources such as switches and voice ports. Therefore, it is desirable to provide more efficient systems and methods for routing VoIP calls to mobile device users in a mobile network.

BRIEF DESCRIPTION OF THE DRAWINGS

In the Figures, the left-most digit of a component reference number identifies the particular Figure in which the component first appears.

DETAILED DESCRIPTION

Overview

The described systems and methods identify an appropriate serving switch for processing an incoming Global System for Mobile Communications (GSM) call directed to a subscriber. More specifically, and responsive to receiving a SIP INVITE associated with a GSM call, the systems and methods described herein send a Send Routing Information (SRI) for Short Message (SM) for receipt by a Home Location Register (HLR) to identify the appropriate serving switch in the mobile telecommunications network to process the incoming call. The appropriate serving switch is the center to which the subscriber's mobile device is currently location-updated in the mobile communication network. After identifying the appropriate mobile switching center, the systems and methods map the SIP address of the serving switch to an IP Address or Fully Qualified Domain Name (FQDN). The systems and methods then send the SIP INVITE directly to the mapped address for processing of the incoming call by the identified serving switch. In this manner, the described systems and methods avoid the routing of calls through multiple mobile switching centers, and thereby reduce the network resources necessary to handle VoIP calls in a mobile communication network.

Particular embodiments described herein communicate data using the Session Initiation Protocol (SIP). SIP supports the calling features of conventional telephone systems through a peer-to-peer protocol. SIP is not limited to voice-related applications—SIP is also useful as a general-purpose protocol for any type of multimedia communication session.

Although particular examples discussed herein relate to a SIP router, the systems and methods described herein are applicable to any type of data communication device, for example, a Breakout Gateway Control Function (BGCF) or a SIP proxy device that has been modified to implement the systems and methods described herein. The specific devices, components, systems and communication links discussed herein are provided for purposes of discussion and to provide an exemplary implementation of session initiation protocol routing systems and methods. The described systems and methods are applicable to any type of data received from any type of device in any operating environment.

Additionally, particular examples discussed herein relate to incoming VoIP calls. However, the present SIP router systems and methods can be applied to any type of circuit-switched (CS) call that a Mobile Switching Center (MSC) could process (e.g., GSM calls such as a CS video call, a CS data call, a CS voice call, etc.) that is communicated to (or communicated within) a mobile communication network.

An Exemplary System

Figure 1:
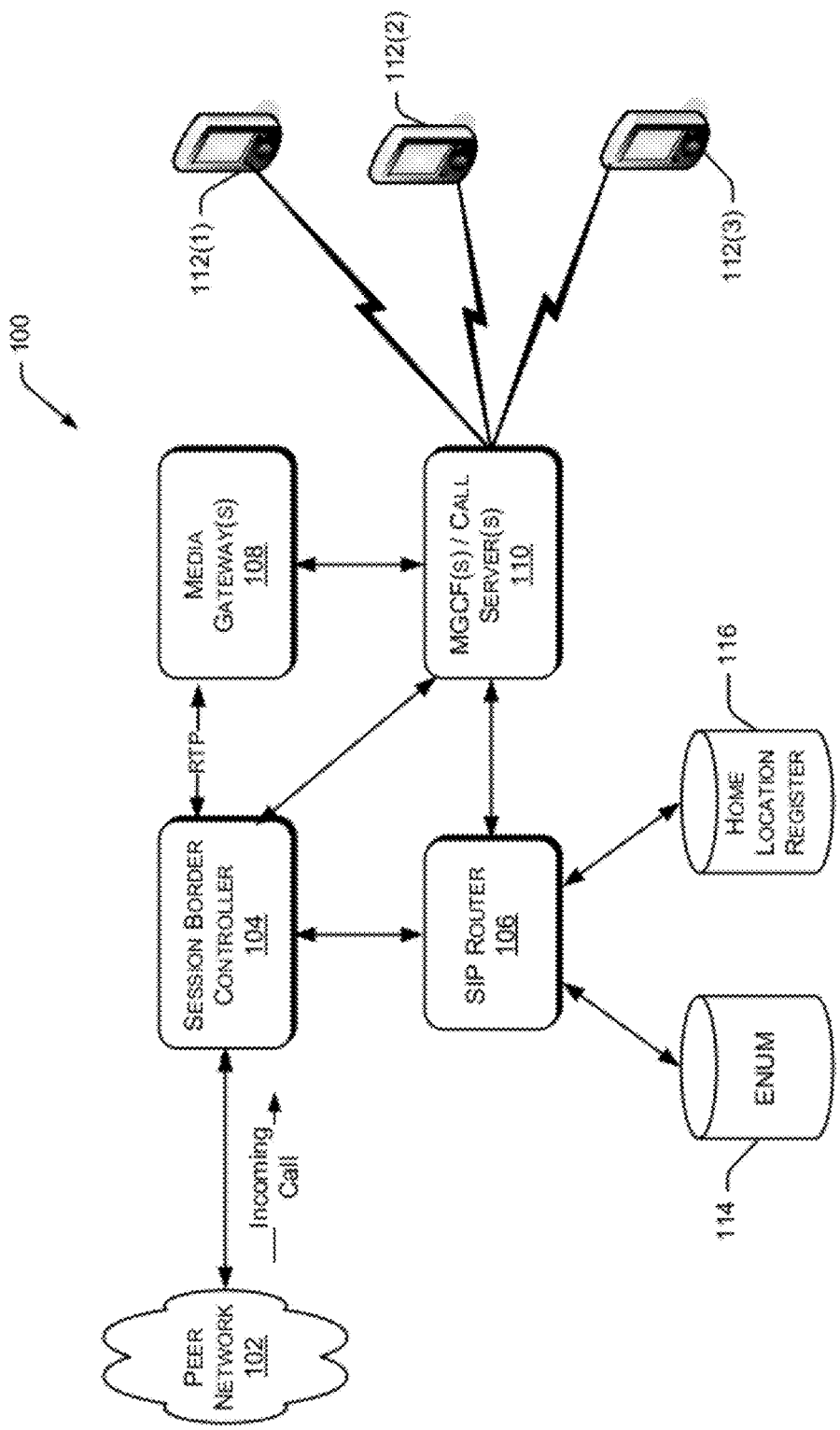
FIG. 1 shows an exemplary environment capable of implementing session initiation protocol SIP INVITE routing systems and methods, according to one embodiment.

FIG. 1 shows an exemplary environment 100 capable of implementing SIP router systems and methods described herein, according to one embodiment. Environment 100 includes a peer network 102 coupled to a session border controller 104. Peer network 102 includes any number of peer systems that communicate, for example, incoming voice calls and other types of calls to session border controller 104. Session border controller 104 controls the flow of information between peer network 102 and other systems and components shown in FIG. 1. For example, session border controller 104 may perform functions that manage quality of service, accept certain data streams and manage data security.

Session border controller 104 is operatively coupled to Session Initiation Protocol (SIP) router 106, media gateway(s) 108, and Media Gateway Controller Function(s) (MGCF(s))/call server component(s) 110. SIP router 106 performs various call routing (and data routing) functions, such as the functions described herein. For example, SIP router 106, responsive to receiving a SIP INVITE pertaining to an incoming GSM call (e.g., "incoming call"), efficiently identifies a serving switch (a respective MGCF/call server 110) to process an incoming call to a target subscriber device 112 in the mobile communication network, wherein the serving switch represents the switch where the target mobile subscriber is currently registered. In another example, SIP router 106 is capable of identifying a serving switch to process VoIP calls directed to a subscriber of a mobile device 112 coupled to a mobile communication network.

Media gateway(s) 108 performs the translations, conversions or other functions necessary to communicate digital media streams (e.g., VoIP streams, etc.) to formats used in a mobile communication network.

In particular implementations, the mobile communication network is a circuit-switching network, such as a Global System for Mobile Communications (GSM) network or Public Switched Telephone Network (PSTN). MGCF/call server 110 is SIP-enabled so the call server to communicate in the IMS domain. MGCF/call server 110 manages connections with multiple mobile devices 112 located within a particular geographic region proximate the respective MGCF/call server. Mobile devices 112 include, for example, cellular phones, smart phones, and/or other devices that include a software client to emulate a mobile phone. Although three mobile devices 112 are shown in FIG. 1, particular implementations may include any number of mobile devices coupled to MGCF(s)/call server(s) 110. The example of FIG. 1 illustrates a MGCF/call server 110 coupled to SIP router 106. In specific implementations, SIP router 106 is coupled to multiple MGCFs/call servers 110, each of which covers a particular geographic region SIP router 106 is coupled to an Electronic Number Mapping (ENUM) database 114 and a Home Location Register (HLR) 116. ENUM database 114, for example, maps an E.164 address to a SIP URI utilizing Domain Name System (DNS) technology. E.164 defines a public telecommunication-numbering plan used in a PSTN and other data networks. SIP Uniform Resource Identifier (URI) is an addressing technique that defines a user's "SIP phone number". A SIP URI has the format "sip:username@domain", where "username" is associated with a particular user and "domain" identifies a particular domain name.

SIP router 106 uses information contained in ENUM database 114 to determine whether a particular incoming call (e.g., a voice call, etc.) is destined for a mobile communication network accessible to SIP router 106. Home location register 116 contains information related to the specific serving MGCF/call server address (e.g., a Global Title Address, etc.) for users/subscribers of the mobile communication network. A Global Title Address is the address used to communicate with an MGCF/call server in a SS7 network.

Although environment 100 shows various individual systems and components, any two or more of these systems and components can be combined into a single system or component. For example, ENUM database 114 and/or home location register 116 may be contained within SIP router 106 in particular embodiments.

Figure 2:
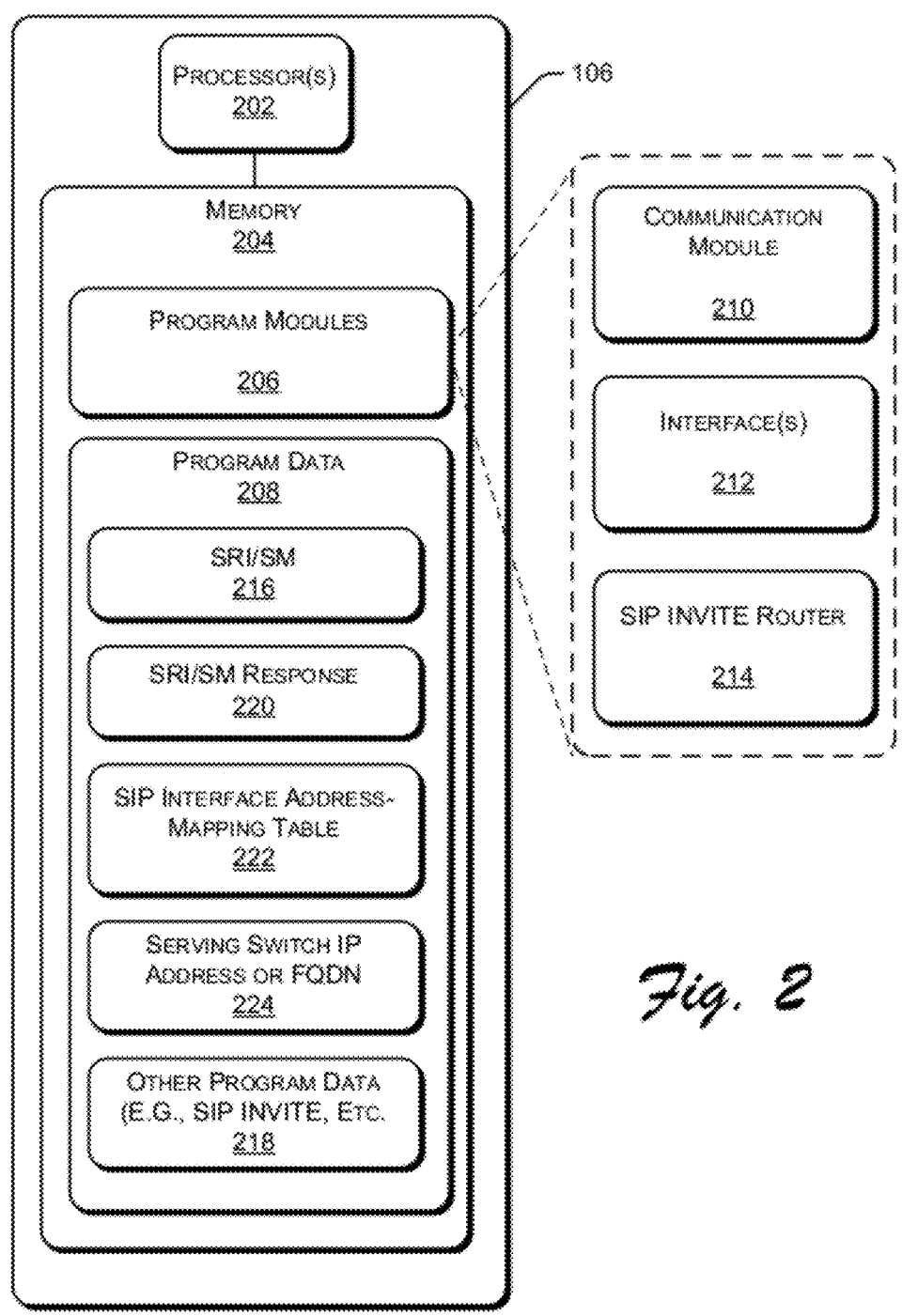
FIG. 2 is a block diagram showing various components of an exemplary Session Initiation Protocol (SIP) router, according to one embodiment.

FIG. 2 is a block diagram showing various components of exemplary SIP router 106, according to one embodiment. SIP router 106 includes one or more processors 202 operatively coupled to memory 204. Memory 204 includes program modules 206 and program data 208. Program modules 206 include, for example, communication module 210, interface(s) 212, SIP INVITE router module 214, and other program modules (not shown, such as an operating system, etc.). Processor 202 executes various computer program instructions in the program modules 206 to implement the functions described herein.

Communication module 210 allows SIP router 106 to communicate with other devices, components and systems, such as the devices, components and systems discussed above with respect to FIG. 1. Communication module 210 allows SIP router 106 to communicate using wired or wireless communication links utilizing any type of communication protocol. Interface(s) module 212 enable the router 106 to connect with other devices, components and systems. SIP INVITE router module 214, responsive to receiving a SIP INVITE associated with an incoming call (as shown in FIG. 1 or otherwise), sends a SRI/SM 216 for receipt by HLR 116. A respective SIP INVITE is shown as respective portion of other program data 218. SIP INVITE router module 214 receives from the HLR a response 220 to the SRI/SM request 216. The response indicates a serving MGCF/call server address (i.e., a respective one of the MGCF(s)/call server(s) 110 of FIG. 1). Responsive to receiving the response 220, module 214 utilizes the SIP interface address-mapping table 222 to identify the IP address or FQDN (224) that is mapped to the received serving switch address. Table 208 contains information to map a serving MGCF/call server address to an IP address or FQDN. SIP INVITE routing module 214 communicates the received SIP INVITE (received at operation 302) to the identified serving switch via the mapped IP address or FQDN. This implementation is very different from traditional processes to identify serving switches to process an incoming call wherein resources of at least two MGCFs/call servers are typically tied up to determine an address of the serving switch.

An Exemplary Procedure for Routing Data

Figure 3:
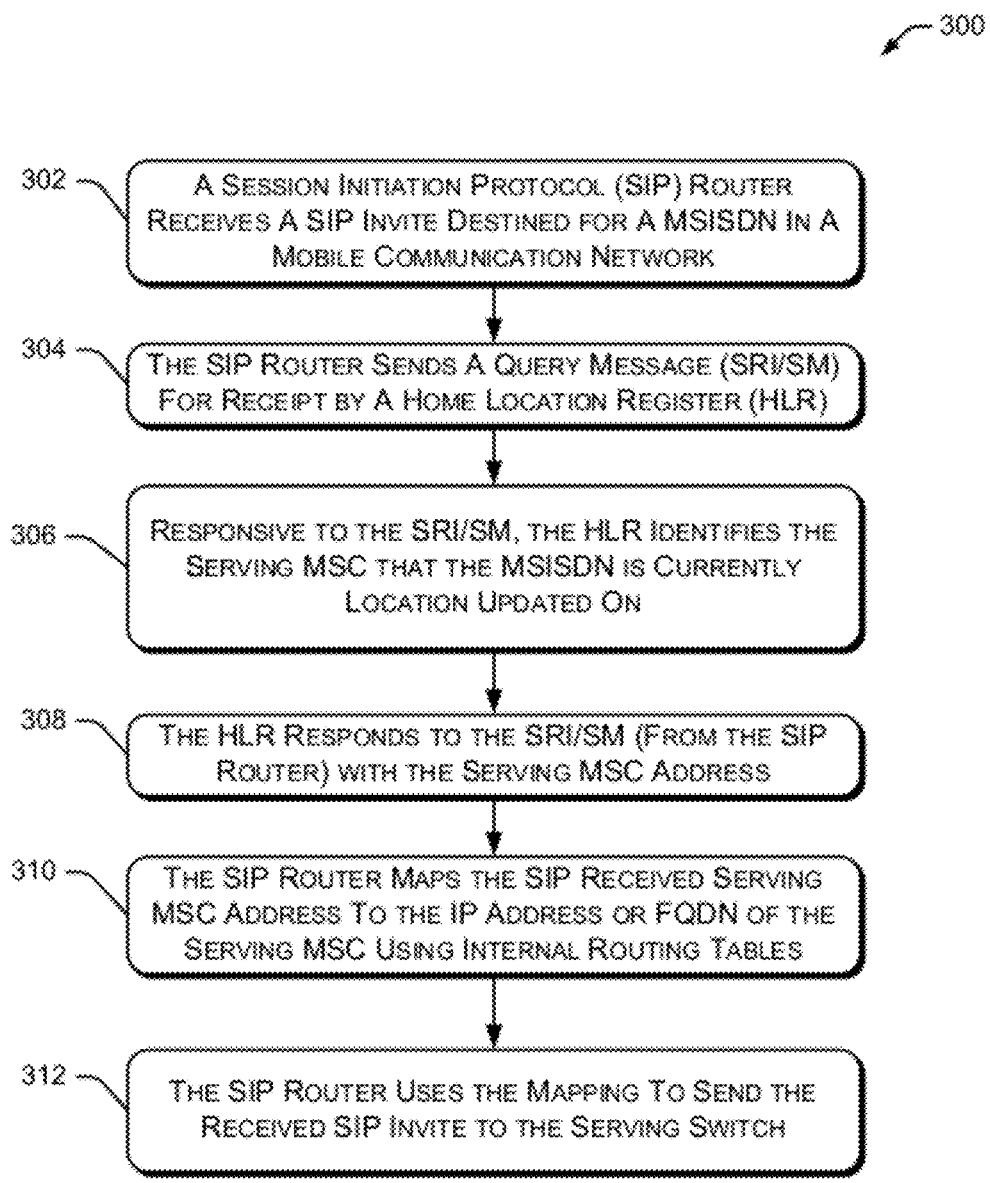
FIG. 3 shows an exemplary procedure for routing a SIP INVITE to a serving switch in a circuit-switched mobile network on which a target subscriber associated with a telephony device is currently registered, according to one embodiment.

FIG. 3 shows an exemplary procedure 300 for determining a serving switch (a respective MGCF/call server 110 of FIG. 1) to process an incoming call to a subscriber in a mobile communication network, according to one embodiment. At block 302, the SIP INVITE router receives a SIP INVITE message pertaining to a GSM call to a target subscriber on the mobile communication network. A GSM call includes but is not limited to a circuit-switched (CS) video call, a CS data call, a CS voice call, or any kind of CS call that a MGCF/call server could process. In one implementation, the call originated in a VoIP peer network 102 (FIG. 1) destined for a MSISDN in a mobile communication network. A MSISDN is a number uniquely identifying a subscription in a GSM or a UMTS mobile network.

In a particular embodiment, the SIP router uses information received from an ENUM database (e.g., ENUM database 114 in FIG. 1) to determine whether a particular incoming call is destined for a mobile network associated with the SIP router. For example, the SIP router queries the ENUM database to retrieve the service provider ID (SPID) that is used to route the VoIP call to its destination. In other embodiments, the determination of the destination mobile network for an incoming call is determined without use of an ENUM database, which can be omitted in this embodiment.

Procedure 300 continues at block 304, where the SIP INVITE router sends a query message for receipt by a home location register. Use of SRI/SM to route incoming calls by identifying a serving switch in a circuit-switched mobile network on which a target mobile subscriber is currently registered is novel. MAP_SEND_ROUTING_INFO_FOR_SM is part of the MAP (Mobile Application Part) Specification in 3GPP TS 09.02.

In this embodiment, procedure 300 does not use a "standard" SRI for voice to query the home location register. This "standard" SRI for voice invokes certain processing in the mobile switching center and in the home location register. This processing (e.g., determining call forwarding information) is not necessary for the implementation of procedure 300. System resources in the mobile switching center and the home location register are conserved using this approach. Instead of using "standard" SRI for voice, SRI-SM is used to query the home location register. This SRI-SM query causes the home location register to generate a response indicating the switch associated with the call destination, without the unnecessary call forwarding information and other details.

Referring again to FIG. 3, at block 306 and in response to the query message received from the SIP router (i.e., the SIP INVITE router), the home location register identifies an address of a serving MGCF/call server to process the received incoming call. The identified serving switch is the switch where the MSISDN of the target mobile subscriber is currently location update on. The appropriate mobile switching center to handle a particular call may change over time as the subscriber's mobile device moves to different geographic locations that are served by different mobile switching centers. Thus, the determination as to the appropriate mobile switching center is made upon receipt of each call to determine the current location of the user's mobile device.

At block 308, the home location register then responds to the SIP router's query by communicating the MGCF/call server address to the SIP router. At block 310, the SIP router receives the serving switch address from the home location register and maps the received MGCF/call server address to the IP address or FQDN associated with the incoming call using a SIP interface address-mapping table. In one implementation, the address-mapping table is a static table. As an example, MGCF/call server address 14044558018 is mapped to IP address 10.161.187.84. It could also be a FQDN like MSC1.networka.com. So if someone was calling at XXX-345-6789 and the SIP Router got a response from the SRI-SM with a MSC SCCP address of 14044558018 the sip router would match that address to IP 10.161.187.84 and send out a SIP INVITE message to URI sip:+13456789;npdi@10.161.187.84:5060;user=phone or if it was mapped it to a FQDN sip:+13456789;npdi@ MSC1.networka.com:5060;user=phone. At block 312, the SIP router uses the information contained in the routing tables to send the received SIP INVITE (block 302) to the identified serving switch so that the serving switch can process the call.

As discussed above, use of SRI-SM to identify the serving switch avoids the unnecessary use of mobile switching center and home location register resources. Additionally, the use of SRI-SM allows the existing mobile switching centers, home location registers and other components/systems to operate without modification. By having a single SIP-enabled mobile switching center (e.g., a respective MGCF/call server 110 in FIG. 1) perform the "standard" SRI message for an incoming call, the incoming call is handled by the single mobile switching center instead of being routed through multiple switching centers. The embodiment discussed above also eliminates the need for a separate gateway switch to process an incoming call.

Specific embodiments discussed herein receive communications from one or more peer networks. In alternate embodiments, the systems and procedures discussed herein are used to route communications between any number of devices in various environments. These alternate embodiments include mobile-to-mobile Inter-MSC Trunking (IMT) traffic (this is MSC to MSC traffic), mobile-to-PSTN communications, mobile-to-voicemail signaling, IP Multimedia Subsystem (IMS)-to-PSTN traffic, and IMS-to-GSM mobile communications. Other embodiments may use the systems and procedures discussed herein to communicate any type of communications between devices or components in any network environment.

Conclusion

Although the systems and methods for a SIP router have been described in language specific to structural features and/or methodological operations or actions, it is understood that the implementations defined in the appended claims are not necessarily limited to the specific features or actions described. Rather, the specific features and operations of routing data are disclosed as exemplary forms of implementing the claimed subject matter.

The invention claimed is:

1. A processor-implemented method comprising:
receiving a SIP INVITE for an incoming call to a target mobile subscriber;
responsive to receiving the SIP INVITE, identifying a first address of a serving switch in a circuit-switched mobile network,
wherein the serving switch is one serving switch among multiple serving switches,
wherein the target mobile subscriber is currently location-updated on, and currently connected to, the serving switch, and
wherein identifying the first address comprises:
transmitting a Send Routing Information for Short Message (SRI/SM) request to a home location register (HLR) associated with the serving switch, and
receiving the first address from the HLR,
wherein the HLR determines the first address of the serving switch, for connecting the incoming call, based on the transmitted SRI/SM request and without communicating with the serving switch, and
wherein the first address is determined, based on the transmitted SRI/SM request, without determining call forwarding information for the incoming call;
mapping the first address of the serving switch to a second address of the serving switch,
wherein the mapping of the first address of the serving switch to the second address of the serving switch is performed at a SIP interface address mapping table, and
wherein the serving switch has the first address in the circuit-switch mobile network and the second address to a SIP interface; and
sending, via the second address, the SIP INVITE to the SIP interface of the serving switch for processing the incoming call to the target mobile subscriber,
wherein the sending of the SIP invite to the serving switch for processing the incoming call is the first transmission to the serving switch associated with the incoming call.

2. The method of claim 1 wherein the SIP INVITE is destined for termination in a circuit-switched mobile environment.

3. The method of claim 1 wherein the incoming call is a packet-switched call that a Media Gateway Control Function (MGCF)/call server can process.

4. The method of claim 1 wherein the second address is an IP address or a Fully Qualified Domain Name (FQDN).

5. A non-transitory computer-readable medium comprising computer-program instructions executable by a processor for performing operations comprising:
receiving a SIP INVITE for an incoming call to a target mobile subscriber;
responsive to receiving the SIP INVITE, identifying a first address of a serving switch in a circuit-switched mobile network,
wherein the serving switch is one serving switch among multiple serving switches,
wherein the target mobile subscriber is currently location-updated on, and currently connected to, the serving switch, and
wherein identifying the first address comprises:
transmitting a Send Routing Information for Short Message (SRI/SM) request to a home location register (HLR) associated with the serving switch, and
receiving the first address from the HLR, wherein the HLR determines the first address of the serving switch, for connecting the incoming call, based on the transmitted SRI/SM request and without communicating with the serving switch, and wherein the first address is determined, based on the transmitted SRI/SM request, without determining call forwarding information for the incoming call;

mapping the first address of the serving switch to a second address of the serving switch, wherein the mapping of the first address of the serving switch to the second address of the serving switch is performed at a SIP interface address mapping table, and wherein the serving switch has the first address in the circuit-switch mobile network and the second address to the SIP interface; and sending, via the second address, the SIP INVITE to the SIP interface of the serving switch for processing the incoming call to the target mobile subscriber, wherein the sending of the SIP invite to the serving switch for processing the incoming call is the first transmission to the serving switch associated with the incoming call.

6. The non-transitory computer-readable medium of claim 5 wherein the SIP INVITE is destined for termination in a circuit-switched mobile environment.

7. The non-transitory computer-readable medium of claim 5 wherein the incoming call is a packet-switched call that a Media Gateway Control Function (MGCF)/call server can process.

8. The non-transitory computer-readable medium of claim 5 wherein the second address is an IP address or a Fully Qualified Domain Name (FQDN).

9. An apparatus comprising:

a processor; and a memory coupled to the processor, the memory comprising computer executable instructions that when executed by the processor performing operations including:

receiving a SIP INVITE for an incoming call to a target mobile subscriber;

responsive to receiving the SIP INVITE, identifying a first address of a serving switch in a circuit-switched mobile network, wherein the serving switch is one serving switch among multiple serving switches, wherein the target mobile subscriber is currently location-updated on, and currently connected to, the serving switch, and wherein identify the first address comprises:

transmitting a Send Routing Information for Short Message (SRI/SM) request to a home location register (HLR) associated with the serving switch, and receiving the first address from the HLR wherein the HLR determines the first address of the serving switch, for connecting the incoming call, based on the transmitted SRI/SM request and without communicating with the serving switch, and wherein the first address is determined, based on the transmitted SRI/SM request, without determining call forwarding information for the incoming call;

mapping the first address of the serving switch to a second address to the serving switch, wherein the mapping of the first address of the serving switch to the second address of the serving switch is performed at a SIP interface address mapping table, and wherein the serving switch has the first address in the circuit-switch mobile network and the second address to the SIP interface; and sending, via the second address, the SIP INVITE to the SIP interface of the serving switch for processing the incoming call to the target mobile subscriber, wherein the sending of the SIP invite to the serving switch for processing the incoming call is the first transmission to the serving switch associated with the incoming call.

10. The apparatus of claim 9 wherein the SIP INVITE is destined for termination in a circuit-switched mobile environment.

11. The apparatus of claim 9 herein the incoming call is a packet-switched call that a Media Gateway Control Function (MGCF)/call server can process.

12. The apparatus of claim 9 wherein the second address is an IP address or a Fully Qualified Domain Name (FQDN).

* * * * *